US012637389B2

(12) United States Patent
Tariku et al.

(10) Patent No.: US 12,637,389 B2
(45) Date of Patent: May 26, 2026

(54) AEROGEL ENHANCED BIO-BASED BUILDING MATERIAL

(71) Applicant: British Columbia Institute of Technology, Burnaby (CA)

(72) Inventors: Fitsum Tariku, Burnaby (CA); Farshad Babaahmadi, Burnaby (CA)

(73) Assignee: British Columbia Institute of Technology, Burnaby (CA)

( * ) Notice: Subject to any disclaimer, the term of this patent is extended or adjusted under 35 U.S.C. 154(b) by 489 days.

(21) Appl. No.: 18/310,775

(22) Filed: May 2, 2023

(65) Prior Publication Data

US 2023/0399260 A1 Dec. 14, 2023

Related U.S. Application Data

(60) Provisional application No. 63/351,508, filed on Jun. 13, 2022.

(51) Int. Cl.
| | |
|---|---|
| *C04B 16/06* | (2006.01) |
| *C04B 7/34* | (2006.01) |
| *C04B 9/02* | (2006.01) |
| *C04B 9/04* | (2006.01) |
| *C04B 14/06* | (2006.01) |
| *C04B 22/00* | (2006.01) |
| *C04B 22/06* | (2006.01) |
| *C04B 22/16* | (2006.01) |
| *C04B 28/12* | (2006.01) |
| *C04B 28/32* | (2006.01) |

(52) U.S. Cl.
CPC ............... *C04B 16/06* (2013.01); *C04B 7/34* (2013.01); *C04B 9/02* (2013.01); *C04B 9/04* (2013.01); *C04B 14/064* (2013.01); *C04B*
*22/0013* (2013.01); *C04B 22/066* (2013.01); *C04B 22/16* (2013.01); *C04B 28/12* (2013.01); *C04B 28/32* (2013.01)

(58) Field of Classification Search
CPC .. C04B 16/06; C04B 7/34; C04B 9/02; C04B 9/04; C04B 14/064; C04B 22/0013; C04B 22/066; C04B 22/16; C04B 28/12; C04B 28/32; C04B 28/006; C04B 28/34; C04B 40/0039
See application file for complete search history.

(56) References Cited

U.S. PATENT DOCUMENTS

| | | | | |
|---|---|---|---|---|
| 10,040,720 B2 * | 8/2018 | Stahl | ........................ | C04B 14/16 |
| 10,836,073 B2 * | 11/2020 | Fay | ........................ | F16L 59/025 |
| 10,941,897 B2 * | 3/2021 | Kim | ........................ | C01B 33/155 |
| 2020/0255295 A1 * | 8/2020 | Kim | ........................ | C01B 33/159 |

FOREIGN PATENT DOCUMENTS

DE 102009033367 B4 * 3/2016 ........... C04B 14/064

OTHER PUBLICATIONS

Slosarczyk "Recent Advances in Research on the Synthetic Fiber Based Silica Aerogel Nanocomposites", Nanomaterials 2017, 7, 44; doi:10.3390/nano7020044, pp. 1-15, www.mdpi.com/journal/nanomaterials (Year: 2017).*

* cited by examiner

*Primary Examiner* — Anthony J Green
(74) *Attorney, Agent, or Firm* — Michael R Williams; Ryan W Dupuis; Ade & Company Inc.

(57) ABSTRACT

Described herein is bio-fiber-based building material wherein the thermal performance is improved by two to four-fold over the prior art Hemperete by identifying and incorporating performance-enhancing ingredients into a bio-fiber and binder mix using specifically developed mixing formulas.

19 Claims, 1 Drawing Sheet

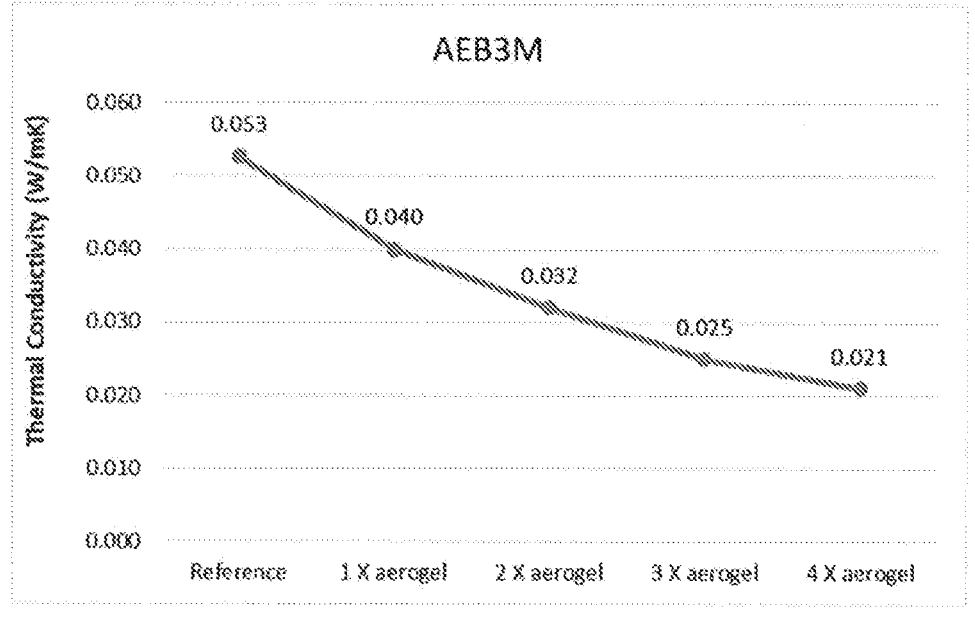

AEROGEL ENHANCED BIO-BASED BUILDING MATERIAL

The instant application claims the benefit of U.S. Provisional Patent Application Ser. No. 63/351,508, filed Jun. 13, 2022, and entitled "AEROGEL ENHANCED BIO-BASED BUILDING MATERIAL", the entire contents of which are incorporated herein by reference for all purposes.

BACKGROUND OF THE INVENTION

Buildings have a significant environmental footprint. In Canada, buildings consume about 50% of extracted natural resources and produce 25% of landfill solid waste. They are also responsible for the consumption of about one-third of the national energy supply and release 28% of the total greenhouse gas emissions (GHG). There is a need to develop efficient use of energy and natural resources as well as to shift from non-renewable to renewable natural resources. From an environmental footprint perspective, the ideal construction material is one that is local, renewable, has low embedded energy and GHG emissions, and at the same time has a high thermal resistance and thermal mass values to minimize the operational energy and GHG emissions of the building during its service life. Bio-based building materials have the potential to satisfy these desired attributes. Currently, researchers are working on developing such materials from trees and other small plant fibers such as hemp. The added advantage of small plants is that they grow faster than trees and can be replenished more frequently. Although bio-based materials seem to be promising from an environmental impact perspective, their low thermal performance limits their application in the building sector as insulation material.

One of the less efficient bio-based materials currently used in building envelope systems is Hemperete (also known as hemp-lime or hemp-lime concrete). Hemperete is a composite material created from a mix of hemp plant hurd (or hemp shive), lime-based binder, and water. The thermal conductivity values of hemperete in the current form are reported to range between 0.07 to 0.13 W/mK.

For example, U.S. Pat. No. 10,040,720 teaches a dry blend that is used as thermal insulation. The material is applied as a paste that is 60-90 vol % hydrophobized granular silica aerogel, 0.5-30 vol % purely mineral binder, 0.2-20 vol % of an open-porous water-insoluble or slowly water-soluble additive having an accessible pore volume, up to 5 vol % reinforcing fibers and up to 5 vol % processing additives.

U.S. Pat. No. 10,836,073 teaches a thermal insulation mat comprising 50 wt %-wt % aerogel particles, 3 wt % coarse glass fibers and about 10 wt % of glass microfibers. Binder options listed therein are polysiloxane, polyacrylic, phenolic, polyethylene acrylate copolymer, polyethylene vinyl acetate and polyvinyl alcohol, although the specific binder used was Polon MF-56 by Shin-Etsu Silicones of America.

U.S. Pat. No. 10,941,897 teaches a thermal insulation blanket made as follows: to a mixed solution prepared by mixing tetraethyl orthosilicate (TEOS) and ethanol at a weight ratio of 3:1, a solution of hydrochloric acid diluted with water (concentration: 0.15 wt %) was added such that the pH of the mixed solution was to be 1 and then mixed to prepare a silica sol (silica content in the silica sol=4 wt %). Next, to the silica sol, an ammonia catalyst was added at a volume ratio of 100:0.5 (silica sol:ammonia catalyst), and glass fiber was deposited for gelation to prepare a wet gel-base material composite.

SUMMARY OF THE INVENTION

According to a first aspect of the invention, there is provided a bio-fiber based building material comprising: about 12 to about 70 vol % bio-fiber; about 3.4 to about 24 vol % binder; about 12 to about 69 vol % hydrophobized granular silica aerogel particles; and about 9 to about 16 vol % water.

At least about 80% of the aerogel particles may have a particle size of between about 0.01 mm to about 2 mm. For example, the particle size may be between about mm to about 1.2 mm with about a 20 nm pore diameter.

The binder may be lime/metakaolin or a magnesium-based binder.

For example, the magnesium-based binder is magnesium oxychloride or magnesium phosphate.

In some embodiments, the $MgO:PO_4$ or $MgO:MgCl_2$ molar ratio is about 2 to about 8:1.

In some embodiments, the bio-fiber is selected from the group consisting of flax fiber, straw bales of wheat, and rice.

In some embodiments, at least about 70% of the bio-fibers have a length between about 3 mm to about 12 mm and are about 2 mm to about 3 mm thick.

In some embodiments, the bio-fibers have a mean length of about 7 mm and about a 2 mm mean thickness.

In some embodiments, sodium tetraborate decahydrate is added at about 0.1 vol %.

In some embodiments, hydroxypropyl methylcellulose is added at about 0.1 vol %.

In some embodiments, the mixture comprises: about 12 to about 70 vol % hemp shive; about 3.4 to about 24 vol % binder; about 12 to about 69 vol % hydrophobized granular silica aerogel particles; and about 9 to about 16 vol % water.

In some embodiments, the mixture comprises: about 1.2 to about 2.3 vol % Magnesium oxide; about 2.9 to about 5.6 vol % monopotassium phosphate; about 16.4 to about 70 vol % hemp shive; about 16 to about 69 vol % hydrophobized granular silica aerogel particles; about 0.2 vol % processing additives; and about 9 to about 16 vol % water.

In some embodiments, the mixture comprises: about 1.3 to about 4.61 vol % Magnesium oxide; about 2.1 to about 7.53 vol % magnesium chloride solution; about 15.4 to about 71 vol % hemp shive; about 15 to about 70 vol % hydrophobized granular silica aerogel particles; about 0.2 vol % processing additives; and about 9 to about 16 vol % water.

In some embodiments, the mixture comprises: about 5.1 to about 14.8 vol % hydrated lime; about 3.3 to about 9.2 vol % metakaolin; about 12 to about 67 vol % hemp shive; about 12 to about 64.2 vol % hydrophobized granular silica aerogel particles; about 0.2 vol % processing additives; and about 11 to about 16 vol % water.

In some embodiments, the bio-fiber based building material is used to form a block or to pour a wall assembly.

According to another aspect of the invention, there is provided a method for preparing a bio-fiber based building material comprising: a) mixing a binder with hydrophobized granular silica aerogel particles, thereby forming a first mixture; b) adding the first mixture to a quantity of biofibers, thereby forming a second mixture; c) mixing a first quantity of water with the second mixture such that the binder is partially activated so that the binder sticks to the aerogel particles, thereby forming a third mixture; and d) mixing a second quantity of water with the third mixture, thereby forming a paste for use as a bio-fiber based building material.

In some embodiments, the ratio of the first quantity of water to the second quantity of water is from about 1: about 4 to about 9: about 11.

In some embodiments, the paste comprises: about 12 to about 70 vol % bio-fiber; about 3.4 to about 24 vol % binder; about 12 to about 69 vol % hydrophobized granular silica aerogel particles and about 9 to about 16 vol % water.

In some embodiments, at least about 80% of the aerogel particles have a particle size of between about 0.01 to about 2 mm. In some embodiments, the particle size is between about 0.01 mm to about 1.2 mm with about a 20 nm pore diameter.

In some embodiments, the binder is lime/metakaolin or a magnesium-based binder.

In some embodiments, the magnesium-based binder is magnesium oxychloride or magnesium phosphate. The $MgO:PO_4$ or $MgO:MgCl_2$ molar ratio may be about 2 to about 8:1.

In some embodiments, the bio-fiber is selected from the group consisting of flax fiber, straw bales of wheat, and rice.

In some embodiments, at least about 70% of the bio-fibers have a length between about 3 mm to about 12 mm and are about 2 mm to about 3 mm thick.

In some embodiments, the bio-fibers have a mean length of about 7 mm and about a 2 mm mean thickness.

In some embodiments, sodium tetraborate decahydrate is added at about 0.1 vol %.

In some embodiments, hydroxypropyl methylcellulose is added at about 0.1 vol %.

In some embodiments, the paste comprises: about 12 to about 70 vol % hemp shive; about 3.4 to about 24 vol % binder; about 12 to about 69 vol % hydrophobized granular silica aerogel particles; and about 9 to about 16 vol % water.

In some embodiments, the paste comprises: about 1.2 to about 2.3 vol % Magnesium oxide; about 2.9 to about 5.6 vol % monopotassium phosphate; about 16.4 to about 70 vol % hemp shive; about 16 to about 69 vol % hydrophobized granular silica aerogel particles; about 0.2 vol % processing additives; and about 9 to about 16 vol % water.

In some embodiments, the paste comprises: about 1.3 to about 4.61 vol % Magnesium oxide; about 2.1 about 7.53 vol % magnesium chloride solution; about 15.4 to about 71 vol % hemp shive; about 15 to about 70 vol % hydrophobized granular silica aerogel particles; about 0.2 vol % processing additives; and about 9 to about 16 vol % water.

In some embodiments, the paste comprises: about 5.1 to about 14.8 vol % hydrated lime; about 3.3 to about 9.2 vol % metakaolin; about 12 to about 67 vol % hemp shive; about 12 to about 64.2 vol % hydrophobized granular silica aerogel particles; about 0.2 vol % processing additives; and about 11 to about 16 vol % water.

In some embodiments, following step (d), the paste is formed into a block or poured into a wall assembly.

BRIEF DESCRIPTION OF THE DRAWINGS

FIG. 1 shows laboratory measured thermal conductivity of five different formulations of the newly developed Aerogel Enhanced Hemp block.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

As used herein, "about" or "approximately" refers to a value that is within 10% of the base value. For example, a value that is "about 10" refers to a value that is between 9-11.

Described herein is bio-fiber-based building material wherein the thermal performance is improved by two to four-fold over the prior art Hemperete by identifying and incorporating performance-enhancing ingredients into a bio-fiber and binder mix using specifically developed mixing formulas.

As discussed herein, the bio-fiber has to be porous, low density, and should have relatively low thermal conductivity. Examples of such material include but are by no means limited to flax fiber, straw bales of wheat, rice and the like. Other suitable bio-fibers will be well-known to those of skill in the art.

As will be appreciated by one of skill in the art, the new product can have many variations depending on the selected ingredients and mixing ratio, as discussed herein.

In one embodiment of the invention, the formula for the mixture for preparing the bio-fiber based building material or the mixture for preparing a bio-fiber based building material comprises:

about 12 to about 70 vol % bio-fiber;

about 3.4 to about 24 vol % binder; and about 12 to about 69 vol % hydrophobized granular silica aerogel and about 9 to about 16 vol % water.

In some embodiments of the invention, the bio-fiber is selected from the group consisting of flax fiber, straw bales of wheat, and rice.

As discussed herein, in some embodiments of the invention, the formula comprises:

about 12 to about 70 vol % hemp shive;

about 3.4 to about 24 vol % binder;

about 12 to about 69 vol % hydrophobized granular silica aerogel; and about 9 to about 16 vol % water.

In other embodiments of the invention, the formula comprises:

about 1.2 to about 2.3 vol % Magnesium oxide about 2.9 to about 5.6 vol % monopotassium phosphate about 16.4 to about 70 vol % hemp shive about 16 to about 69 vol % hydrophobized granular aerogel about 0.2 vol % processing additives about 9 to about 16 vol % water In some embodiments, the processing additives comprise but are by no means limited to sodium tetraborate decahydrate and/or Hydroxypropyl methyl cellulose.

In other embodiments of the invention, the formula comprises:

about 1.3 to about 4.61 vol % Magnesium oxide;

about 2.1 to about 7.53 vol % magnesium chloride solution;

about 15.4 to about 71 vol % hemp shive;

about 15 to about 70 vol % hydrophobized granular aerogel;

about 0.2 vol % processing additives, for example, Hydroxypropyl methyl cellulose; and about 9 to about 16 vol % water.

In another embodiment of the invention, the formula comprises:

about 5.1 to about 14.8 vol % hydrated lime;

about 3.3 to about 9.2 vol % metakaolin;

about 12 to about 67 vol % hemp shive;

about 12 to about 64.2 vol % hydrophobized granular aerogel;

about 0.2 vol % processing additives, for example, Hydroxypropyl methyl cellulose; and about 11 to about 16 vol % water.

In some embodiments, the processing additives further comprise water retaining agents and/or water retarders.

In some embodiments, the bio-fiber, for example, the hemp shive has a low length to width ratio. For example, in some embodiments, at least about 70% of the bio-fibers, for example, the hemp shives have a length between about 3 mm to about 12 mm and about 2 mm to about 3 mm thick. Alternatively, the shives may have a mean length of about 7 mm and about a 2 mm mean thickness.

Specifically, finer particles are preferred, since they provide a more integrated mix and it is easier to coat them with binder because of a higher surface to volume ratio, as discussed below.

In some embodiments, the binder is lime/metakaolin or a magnesium-based binder, for example, magnesium oxychloride or magnesium phosphate. Lime is a calcium-containing inorganic mineral composed primarily of oxides, and hydroxide, usually calcium oxide and/or calcium hydroxide and Metakaolin is a pozzolanic material which is a dehydroxylated form of the clay mineral kaolinite.

Besides having high insulative properties, the aerogel acts as an expanding agent to increase the volume of binder. As will be appreciated by one of skill in the art, finer particles disperse better in binder and provide a uniform dry mixture because they disperse easier and make an even mix which looks like a one-component binder. In case of using large particles since the particle size difference between powder binder and aerogel will be increased, the resulted mix is not very smooth, and it looks like a two-component binder. Accordingly, in some embodiments, at least about 80% of the aerogel particles have a size of between about 0.01 to about 2 mm. In some embodiments, the particle size is between about 0.01 mm to about 1.2 mm particle size, with about a 20 nm pore diameter.

As known by those of skill in the art, Si $(OCH_3)_4$+ $2H_2O \leftrightarrow SiO_2 + 4CH_3OH$ is the simplified reaction of silica aerogel synthesis The product can be manufactured as blocks of different shapes and sizes offsite (at a manufacturing plant) or poured in a wall frame to form a wall assembly on site, as discussed herein.

As discussed herein, the bio-based building material of the invention is low-embodied carbon and low-embodied energy. Specifically, end products absorb $CO_2$ from the atmosphere by a carbon sequestration-hardening mechanism.

Growing concerns regarding carbon emissions, climate change and global warming have impelled the researchers to make efforts to develop sustainable and environmentally friendly construction materials like vegetal concrete using biomass, which not only possess low embodied energy and renewability but also have the added benefits of carbon sequestration. Hemperete is one of these promising materials and due to its low embodied carbon and energy is an ideal choice for fast-growing green buildings industry. Bio-based materials are able to capture $CO_2$ from the atmosphere during their lifetime and lock it up within the building when they are used as a building material resulting in extremely low embodied carbon building material [1]. It is of note that that 1 m 2 of hemperete wall with 0.26 m thickness sequesters 14-35 kg of $CO_2$ (54-135 kg of $CO_2/m^3$) over its 100 year life span, while producing an equivalent concrete wall made by Portland cement releases 52 kg of $CO_2$ (200 $CO_2/m^3$) [2], a difference of 146 to 335 $CO_2/m^3$ Embodied emissions of the construction and material manufacturing processes contributed about 28% of the emissions in building and construction sectors. Embodied energy is the sum of all the energy required to produce a material including raw material, extraction, transport, manufacture, assembly, installation, disassembly, deconstruction and/or decomposition. This energy is much lower in bio-based building materials compared to synthetic products [3,4].

Besides low embodied carbon, bio-based building materials can positively impact the indoor comfort levels and well-being of residents due to their unique moisture buffering property. Due to moisture buffering ability, these materials can absorb and release moisture in response to indoor relative humidity changes and reduce the risk of mold growth on interior finishes, allergies and respiratory problems [5, 10]. Its thermal mass also contributes to buildings thermal comfort and reduction of buildings cooling energy [10].

Furthermore, the end product has low thermal conductivity, as discussed herein. In recent decades, climate change and energy crisis have become the major concern to different countries globally. One of the biggest future challenges is providing adequate energy for the exponentially growing population [6]. Greenhouse gas emission is a direct result of energy consumption and the building sector contributes more than 30% of greenhouse gas emission in developed countries [7]. In Canada, over 30% of national energy production is used in residential and commercial buildings, mainly for heating and cooling, which demonstrate the significance of the energy saving from implementation of proper insulations in building envelope. Moreover, recent changes in building energy codes require higher thermal resistance for buildings. This means using higher thickness of conventional insulation materials, which leads to a decrease in the usable space and considerable loss from a market viewpoint. So, the alternative solution is using high thermal performance materials in the envelope system in order to have slimmer assemblies [8].

Using bio aggregates in concretes like for example hemp shives offers many advantages to composites, for example, low thermal conductivity and high ductility.

However, interactions between hemp shives and mineral binders may lead to low mechanical properties. Specifically, research revealed that there is a direct relationship between a delay in the hydration process and the quantity of extractable compounds and degradation byproducts of shives which are released due to high alkalinity of the mineral binder mixes. Chemical analysis showed that the delay in setting of the mineral binders is due to polysaccharide and lignin-like materials leaching from the shives.

Accordingly, some studies were conducted to evaluate the effect of shive extractable compounds on the hydration process and compressive strength of hemp lime concretes [9]. The influence of 3 types of shives and their corresponding water extracts on binder setting was examined. They prepared the shive water extract by mixing the shives and cold water for 24 hours and then used the extracted water for binder setting. In order to determine the setting depth, they performed a needle penetration test. For all types of the shives, the shives water extracts (CA, CB, CC) caused delay in setting and hydration process compared to the sample produced by pure water. This irreversibly negatively affected the compressive strength of the samples.

As discussed herein, magnesium-based binder is used instead of cement or lime in the hemp-based composites of the invention in order to increase their compressive strength. The main advantage of using magnesium binders is their high compatibility with organic fillers like bio-fibers, for example, hemp shives, in comparison with lime-based binders. With lime-based binders, the high alkaline environment of the mix results in the release of lignin and other organic compounds from the bio-based materials. These compounds affect the hardening process by retarding the setting of cement or lime. Consequently, the higher compressive strength of the magnesium binder mortars and higher compatibility with shives compared to lime make it a promising alternative material for producing bio-fiber concretes, for example, hemp concretes.

Magnesium-based binders, for example, magnesium oxide powder (MgO) have a higher binder strength than lime-based binders and a greater compatibility with organic fillers like hemp shives than lime-based binders, which make it possible to produce samples with lower binder content and better thermal performance, as discussed herein.

Specifically, in some embodiments, the volume percentage of the solid binder in some formulations can be reduced to 1.3% and the block still possesses acceptable strength.

That is, because the alkalinity of magnesium-based binders is lower than other mineral binders like cement or lime, there is no high alkalinity mix produced as is produced by common mineral binders like cement and lime which lead to the release of lignin and other organic compounds from bio-based materials which interrupt the curing process. Consequently, there is a design limitation and only low content of the bio-fibers can be used in those mixes using alkaline mixes, specifically, mineral binders.

However, the curing pace of magnesium phosphate binders is extremely fast, and the reaction is exothermic. Therefore, it should be specifically reformulated to be applicable in mixes containing aerogel particles. Specifically, as discussed herein, the presence of aerogel requires that the mixing speed be low to avoid cracking of the particles. Consequently, the following measures are implemented to maintain enough time for the mixing and molding process.

Different $MgO:PO_4$ molar ratio is considered for binder formulation to modify the binder properties and reaction pace.

In some embodiments, the $MgO:PO_4$ or $MgO:MgCl_2$ molar ratio is 3-8:1, for example, 2:1 3:1, 6:1, or 8:1, as discussed herein In some embodiments of the invention, sodium tetraborate decahydrate is used to control the reaction pace.

The sodium tetraborate decahydrate may be added at about 0.1 vol %.

While sodium tetraborate decahydrate is a good match for magnesium phosphate binder, other additives that may be used with the invention will be readily apparent to one of skill in the art and are within the scope of the invention.

Furthermore, there is competition for water between the binder and hemp, as hemp absorbs 3× its weight in water rapidly due to its porous structure. On the other hand, aerogels repel water.

In some embodiments, Hydroxypropyl methylcellulose (HPMC) is used to turn the water into a gel and modify the viscosity of water and by doing that the following goals are achieved:

Decreased water absorption by shives;

Eliminating aerogel segregation in mixture;

Maintaining water for curing of the binder.

The idea is to change the physical properties of the water while also retaining water for binder hardening process. Accordingly, other thickeners and viscosity modifiers, like for example, ether cellulous, will provide similar advantages and are within the scope of the invention.

In some embodiments of the invention, HPMC is added at about 0.1 vol %. Furthermore, as discussed herein, in some embodiments, the HPMC is mixed with the binder and the aerogel particles to form a first dry mixture which is then added to the biofibers.

In some embodiments, the mixture is mixed until a uniform mixture with no segregation of individual components is produced. This decision may be made based on visual inspection.

The product manufacturing process includes mixing, casting, and drying. In the mixing process, hemp shives, binder and silica aerogel granulates are weighted based on the specific formulation, and mixed until a uniform dry mixture is attained. Then, water is gradually added to the dry mix to transform it into a paste-like form.

In some embodiments of the invention, 9-16 vol % water is added to the dry mixture. As will be apparent to one of skill in the art, water affects the final density of the products and the curing of binder. Furthermore, aerogel segregation may occur in higher volumes of water. So, the minimum amount of water is favorable and it is defined based on shive and binder content.

The paste form can be readily poured as a cast-in-place material or put in molds to create building blocks of different shapes and sizes. The molds can be filled manually, lightly pressed by hand, and demolded after 48 hours. The wet blocks can be cured at room temperature of 20° C. and 50% relative humidity; however, any conditions that allow for slow and natural hardening will result in a more stable product.

For example, in some embodiments, blocks are kept in the specified environment until they dry. A specimen block is deemed to be dry when its mass change is less than 0.1% for three consecutive measurements of 24-hour time interval, which is in line with the ASTM C 14980-01 specification.

Mixing speed should be low to avoid aerogel particles cracking.

Specifically, the unique properties and low thermal conductivity of the aerogel particles come from the pore structure of it. In case that a lot of particles cracked before the complete curing, water ingresses in the aerogel pores and the thermal performance of the composite will be decreased.

Since the binder volume content is very low, it should be expanded using aerogel particles and then added to hemp to make a dry blend.

In some embodiments, the binder is added to the aerogel first and that mixture is added to the biofibers. In some embodiments, 0.1 vol % HPMC is added to this binder and aerogel mixture before that mixture is added to the biofibers. Water is then added in 2 steps.

In a first step, 25% to 45% of water is added so the binder is partially activated and sticks to the aerogel particles. As will be apparent to one of skill in the art, this can also be express as the ratio of the first quantity of water to the second quantity of water is from about 1:4 to about 9:11.

This ratio is obtained based on the experimental experiences. The idea is that binder sticks to aerogel particles and prevents aerogel segregation once we add the rest of water. Consequently, we don't want complete curing in this first stage.

Then, after about 3 minutes of slow mixing, the rest of the water is added and the hemp particles will be coated by aerogel-binder attachments.

The blocks are demolded after 2 days and exposed to ambient condition.

As discussed herein, a combination of different parameters including strength, reaction pace, mixing speed should be considered at the same time.

Consequently, it is of note that our formulated Magnesium Phosphate binder is a ternary system consisting of magnesium oxide, water, and monopotassium phosphate.

$$MgO + KH_2PO_4 + 5H_2O \rightarrow MgKPO_4 \cdot 6H_2O$$

As illustrated in the above equation, the theoretical molar ratio of MgO:PO4 is 1:1. However, the preliminary experimental evaluations showed that the prepared sample with this ratio did not provide the required strength at lower binder content. Consequently, we made samples with different MgO:PO4 molar ratio and found the ratio of 6:1 has the best balance (in terms of strength and reaction pace) in mixes with aerogel and hemp aggregates although as discussed herein, any molar ratio between 2-8:1 may be used within the invention.

Although increasing the MgO content above 8:1 improved the strength at lower binder content, it decreased the setting time which was not desirable, since we needed low pace reactions to be able to lower the mixing speed and avoid aerogel cracking.

Similarly, for magnesium oxychloride binders, the hardening agent is magnesium chloride. So, we created samples with MgO:MgCl$_2$ molar ratio of 2:1, 3:1, 5:1 and 8:1, and samples with MgO:MgCl$_2$ molar ratio of 3:1 showed better mechanical strength although as discussed herein, any molar ratio between 2-8:1 may be used within the invention.

In the prior art, the application of aerogel in building construction is limited to mat, blanket or rendering.

In contrast, our product can be used as a board or block/infill, for example, to make up a whole wall using only a simple framing system. However, other aerogel-enhanced materials are mainly used for retrofitting current assemblies.

Furthermore, there is no design limit for incorporating bio-based aggregates in our product. However, in contrast, due to the high alkalinity of the mineral binders in aerogel-enhanced rendering, there would be some design limitations.

Furthermore, due to presence of at least 20 V % hemp, hygrothermal performance of our product is completely different with other aerogel-enhanced products and the product is able to store and release excess moisture and regulate the relative humidity of the room.

Finally, compared to other aerogel-enhanced products, our product is a carbon negative material which absorb CO$_2$ from atmosphere by carbon sequestration process, as discussed herein.

For example, thermal conductivity of our product with 70 V % aerogel is 20% lower than the prior art products. Specifically, the best conductivity achieved in that patent was around 0.025 W/mK which is 20% higher than our product where the best conductivity achieved is 0.020 W/mK.

FIG. 1 shows sample thermal conductivity measurement results of some Aerogel Enhanced bio-fiber block formulations. Compared to the conventional hemperete (0.07-0.13 W/mK), the thermal conductivity of the novel hemp building material is significantly lower, as shown in FIG. 1. (range from 0.053 to 0.021 W/mK). The lower the thermal conductivity value is, the better, and the new product yields a thermal resistance performance increase of three to four-fold of that of the conventional hemperete. Specifically, as the aerogel content increases, the thermal conductivity value decreases.

While the preferred embodiments of the invention have been described above, it will be recognized and understood that various modifications may be made therein, and the appended claims are intended to cover all such modifications which may fall within the spirit and scope of the invention.

REFERENCES

[1] M. Lawrence, Reducing the Environmental Impact of Construction by Using Renewable Materials, J. Renew. Mater. 3 (2015) 163-174. https://doi.org/10.7569/JRM.2015.634105.

[2] Walker, R, Pavia, S., & Mitchell, R. (2014). Mechanical properties and durability of hemp-lime concretes. 61, 340-348. https://doi.org/10.1016/j.conbuildmat.2014.02.065.

[3] É. Mata, D. Penalaza, F. Sandkvist, T. Nyberg, What is stopping low-carbon buildings? A global review of enablers and barriers, Energy Res. Soc. Sci. 82 (2021) 102261. https://doi.org/https://doi.org/10.1016/j.erss.2021.102261.

[4] M. Röck, M. R. M. Saade, M. Balouktsi, F. N. Rasmussen, H. Birgisdottir, R. Frischknecht, G. Habert, T. LUtzkendorf, A. Passer, Embodied GHG emissions of buildings—The hidden challenge for effective climate change mitigation, Appl. Energy. 258 (2020) 114107. https://doi.org/https://doi.org/10.1016/j.apenergy.2019.114107.

[5] D. Maskell, A. Thomson, P. Walker, M. Lemke, Determination of optimal plaster thickness for moisture buffering of indoor air, Build. Environ. 130 (2018) 143-150. https://doi.org/https://doi.org/10.1016/j.buildenv.2017.11.045.

[6] B. Abu-Jdayil, A. H. Mourad, W. Hittini, M. Hassan, S. Hameedi, Traditional, state-of-the-art and renewable thermal building insulation materials: An overview, Constr. Build. Mater. 214 (2019) 709-735. https://doi.org/10.1016/j.conbuildmat.2019.04.102.

[7] J. Cha, S. Kim, K.-W. Park, D. R. Lee, J.-H. Jo, S. Kim, Improvement of window thermal performance using aerogel insulation film for building energy saving, J. Therm. Anal. calorim. 116 (2014) 219-224. https://doi.org/10.1007/s10973-013-3521-5.

[8] S. Molleti, D. Lefebvre, D. van Reenen, Long-term in-situ assessment of vacuum insulation panels for integration into roofing systems: Five years of field-performance, Energy Build. 168 (2018) 97-105. https://doi.org/10.1016/j.enbuild.2018.03.010.

[9] Diquélou, Y., Gourlay, E., Arnaud, L., & Kurek, B. (2015). Impact of hemp shiv on cement setting and hardening: Influence of the extracted components from the aggregates and study of the interfaces with the inorganic matrix. Cement and Concrete Composites, 55, 112-121. https://doi.org/https://doi.org/10.1016/j.cemconcom p.2014.09.004

[10] Yina S and Tariku, F. (2021) Hemperete building performance in mild and cold climates: Integrated analysis of carbon footprint, energy, and indoor thermal and moisture buffering. Building and Environment 206 (2021). https://doi.org/10.1016/j.buildenv.2021.108377.

The invention claimed is:

1. A bio-fiber based building material comprising a mixture of:

about 12 to about 70 vol % bio-fiber;

about 3.4 to about 24 vol % binder;

about 12 to about 69 vol % hydrophobized granular silica aerogel particles; and about 9 to about 16 vol % water.

2. The bio-fiber based building material according to claim 1 wherein at least 80% of the aerogel particles have a particle size of between about 0.01 to about 2 mm.

3. The bio-fiber based building material according to claim 2 wherein the particle size is between about 0.01 mm to about 1.2 mm with about a 20 nm pore diameter.

4. The bio-fiber based building material according to claim 1 wherein the binder is lime/metakaolin or a magnesium-based binder.

5. The bio-fiber based building material according to claim 4 wherein the magnesium-based binder is magnesium oxychloride or magnesium phosphate.

6. The bio-fiber based building material according to claim 4 wherein a $MgO:PO_4$ or $MgO:MgCl_2$ molar ratio is about 2 to about 8:1.

7. The bio-fiber based building material according to claim 1 wherein the bio-fiber is selected from the group consisting of flax fiber, straw bales of wheat, and rice straw.

8. The bio-fiber based building material according to claim 7 wherein at least 70% of the bio-fibers have a length between about 3 mm to about 12 mm and are about 2 mm to about 3 mm thick.

9. The bio-fiber based building material according to claim 7 wherein the bio-fibers have a mean length of about 7 mm and about a 2 mm mean thickness.

10. The bio-fiber based building material according to claim 1 wherein sodium tetraborate decahydrate is added at about 0.1 vol %.

11. The bio-fiber based building material according to claim 1 wherein hydroxypropyl methylcellulose is added at about 0.1 vol %.

12. The bio-fiber based building material according to claim 1 wherein the mixture comprises:

about 12 to about 70 vol % hemp shive;

about 3.4 to about 24 vol % binder;

about 12 to about 69 vol % hydrophobized granular silica aerogel particles; and about 9 to about 16 vol % water.

13. The bio-fiber based building material according to claim 1 wherein the mixture comprises:

about 1.2 to about 2.3 vol % Magnesium oxide;

about 2.9 to about 5.6 vol % monopotassium phosphate;

about 16.4 to about 70 vol % hemp shive;

about 16 to about 69 vol % hydrophobized granular silica aerogel particles;

about 0.2 vol % processing additives; and about 9 to about 16 vol % water.

14. The bio-fiber based building material according to claim 1 wherein the mixture comprises:

about 1.3 to about 4.61 vol % Magnesium oxide;

about 2.1 to about 7.53 vol % magnesium chloride solution;

about 15.4 to about 71 vol % hemp shive;

about 15 to about 70 vol % hydrophobized granular silica aerogel particles;

about 0.2 vol % processing additives; and about 9 to about 16 vol % water.

15. The bio-fiber based building material according to claim 1 wherein the mixture comprises:

about 5.1 to about 14.8 vol % hydrated lime;

about 3.3 to about 9.2 vol % metakaolin;

about 12 to about 67 vol % hemp shive;

about 12 to about 64.2 vol % hydrophobized granular silica aerogel particles;

about 0.2 vol % processing additives; and about 11 to about 16 vol % water.

16. The bio-fiber based building material according to claim 1 in the form of a block.

17. The bio-fiber based building material according to claim 1 in the form of a wall assembly.

18. The bio-fiber based building material according to claim 1 wherein the mixture is prepared by:

a) mixing a binder with hydrophobized granular silica aerogel particles, thereby forming a first mixture;

b) adding the first mixture to a quantity of biofibers, thereby forming a second mixture;

c) mixing a first quantity of water with the second mixture such that the binder is partially activated so that the binder sticks to the aerogel particles, thereby forming a third mixture; and d) mixing a second quantity of water with the third mixture, thereby forming a paste for use as a bio-fiber based building material.

19. The bio-fiber based building material according to claim 18 wherein the ratio of the first quantity of water to the second quantity of water is from about 1:4 to about 9:11.

* * * * *